(12) United States Patent
Moore et al.

(10) Patent No.: US 7,970,566 B2
(45) Date of Patent: Jun. 28, 2011

(54) CORRELATING POWER CONSUMPTION WITH CPU ACTIVITY

(75) Inventors: Lloyd Alfred Moore, Renton, WA (US); John R Eldridge, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 11/945,277

(22) Filed: Nov. 27, 2007

(65) Prior Publication Data
US 2009/0138218 A1 May 28, 2009

(51) Int. Cl.
G01D 18/00 (2006.01)
G01D 21/00 (2006.01)

(52) U.S. Cl. .................. 702/89; 702/79; 713/400

(58) Field of Classification Search .............. 702/60, 702/61, 79, 85, 89, 176, 178, 183, 186–188; 713/340, 400, 401
See application file for complete search history.

(56) References Cited

U.S. PATENT DOCUMENTS

| | | | |
|---|---|---|---|
| 5,564,015 A | 10/1996 | Bunnell | |
| 5,996,084 A | 11/1999 | Watts | |
| 6,574,739 B1 | 6/2003 | Kung et al. | |
| 6,876,938 B2 * | 4/2005 | Kattan | 702/89 |
| 6,996,728 B2 | 2/2006 | Singh | |
| 7,203,847 B2 | 4/2007 | Park | |
| 7,219,245 B1 | 5/2007 | Raghuvanshi | |
| 7,243,243 B2 | 7/2007 | Gedeon | |
| 2006/0041763 A1 | 2/2006 | Borkar et al. | |
| 2006/0069786 A1 * | 3/2006 | Mogul et al. | 709/229 |
| 2010/0162026 A1 * | 6/2010 | Gross et al. | 713/400 |

OTHER PUBLICATIONS

Benini, et al., "Monitoring System Activity for Os-Directed Dynamic Power Management",Proceedings of the 1998 International Symposium on Low Power Electronics and Design, ISLPED 98, Aug. 10-12, ACM, 1998, pp. 185-190.
Weiser, et al., "Scheduling for Reduced CPU Energy",Proceedings of the First Symposium on Operating Systems Design and Implementation, Usenix Association, Nov. 1994, pp. 11.
Winkelmeyer, "CPU Power Management for SMT and CMP Processors", University of Karlsruhe, Mar. 21, 2007, pp. 1-30.
Cai, et al., "Microarchitectural Power Analysis for CPU Power/Performance Optimization", Intel Corp, pp. 24.
Connolly, "Nokia Refreshes Symbian Tools", BZ Media LLC,1999-2007, pp. 1-3.

* cited by examiner

*Primary Examiner* — Manuel L Barbee

(57) ABSTRACT

Two or more sets of measurement data can be independently collected from causally related characteristics or elements. Such measurements can be synchronized with one another through the identification of a correct offset between their measurement data. An identification of the nature of the causal relationship between the measured characteristics can identify relevant ranges within which the aggregate values of one of the measurements can be obtained. As the offset between the measurements is adjusted, the aggregate values can change and a derivative, or other meaningful function based on the aggregate values can be calculated. The meaningful function, or subsequent functional result of it, can inform a range of offsets within which a local extreme value can be identified. The offset corresponding to such a local extreme value can be the correct offset.

20 Claims, 6 Drawing Sheets

CORRELATING POWER CONSUMPTION WITH CPU ACTIVITY

BACKGROUND

Traditionally, computing devices were designed to perform computations as quickly as possible given any hardware cost and design constraints that may have been applicable. More recently, however, computing devices are being designed to maximize, or minimize a number of aspects beyond merely their computational speed, including their power consumption, their electromagnetic signatures, their heat output and the like. To design such devices, measurements of various aspects or characteristics of the device can be taken to verify compliance with specifications, or to detect and diagnose potential design problems or inefficiencies. In some cases, those measurements may be taken by individual measurement devices or processes that, either due to design or due to more fundamental limitations, are not, or cannot be, synchronized with one another.

Such measurement synchronization problems likewise arise outside of the context of the computing device design arts. For example, many measurement devices, such as the ubiquitous oscilloscope, provide for "trigger" inputs through which one set of measurements can be triggered by, and thereby synchronized with, another set of measurements. However, in certain cases, such trigger inputs may not be practical to use, or may simply not be possible given various physical and mathematical limitations. For example, if the characteristics being measured change at a sufficient rate of speed, or are influenced by the measuring apparatus, it may not be possible to trigger one set of measurements from another. As another example, accurately measuring a particular characteristic may not be possible except from outside of the system or device being measured. Such limitations can arise in power measurements, where accurate measures of power consumed by a device can most readily be obtained from outside of the device itself. In such cases, it can be difficult to synchronize, or trigger, measurements taken from within the system or device with measurements taken from outside of the system or device, and vice-versa.

SUMMARY

In one embodiment, a measurement data correlation mechanism can identify an offset between a first and a second set of measurement data. The first set of measurement data can be of a characteristic that is causally related to another characteristic from which the second set of measurement data can be obtained. Thus, the second set of measurement data can be used to identify relevant regions of measurements and an aggregate of the corresponding first measurement data within those regions can be obtained. The offset between the first and second measurement data can then be adjusted and another aggregate of corresponding first measurement data, that is now, after the offset adjustment, within those regions, can be obtained. In such a manner, aggregate values of the first measurement data within specific regions as a function of the offset between the first and second measurement data can be obtained. The correct offset can be identified by reference to these aggregate values, since the correct offset can produce an extreme value, such as a minimum or a maximum value.

In a further embodiment, because the measured characteristics may be influenced by external factors, the correct offset can be identified, not merely by an extreme value, but rather by an extreme value occurring within a region where the aggregate values relatively consistently approach the extreme value and then relatively consistently deviate from it. Such a behavior of aggregate values across varying offsets can indicate that the extreme value identified is, in fact, associated with a correct offset, and is not a product of an external factor.

In a still further embodiment, a derivative of the aggregate values with respect to the offset can enable an identification of a range within which an extreme value can be associated with the correct offset. For example, a first derivative of the aggregate values with respect to the offset can be used. Alternatively, to filter noise, a windowed average of that first derivative, again with respect to the offset, can be used instead. The occurrence of a minimum of the derivative, or a windowed average of the derivative, within a predefined number of offsets from a maximum of the derivative, or windowed average, can be used to identify a range of offsets, namely the range between the minimum and maximum, within which an extreme value of the aggregate of the first measurement data within specific regions can be identified. The offset corresponding to such an identified extreme value can be the correct offset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the synchronization of two sets of measurement data via the identification of a correct offset of one set with respect to the other set, where the two sets of measurement data are of two characteristics or elements that are causally related. Such a causal relationship can provide for an identification of a correct offset based on extremes of aggregate values of one of the measurement data within specific ranges identified by the other measurement data. To account for external factors, the correct offset can be identified by an extreme aggregate value where the aggregate values for surrounding offsets relatively consistently approach the extreme value. Identification of such an extreme aggregate value can be enabled by reference to a derivative of the aggregate values with respect to the corresponding offsets. Such a windowed average can have a minimum within a predefined number of offsets from a maximum and the offsets corresponding to that minimum and maximum can, thus, define a range of offsets. The extreme aggregate value within such a range can correspond to the correct offset.

The techniques described herein focus on, but are not limited to, the synchronization of two sets of measurement data within the context of a computing device; in particular the synchronization of power consumption with CPU utilization. The techniques described, however, are equally applicable to the synchronization of two sets of measurement data obtained from measurements of any characteristics or elements, either of a computing device, or otherwise, that have a causal relationship. Thus, the techniques described are equally applicable to, for example, two characteristics of an industrial process that cannot, or are not, measured in a synchronized manner such as via a trigger input on an oscilloscope.

Figure 1:
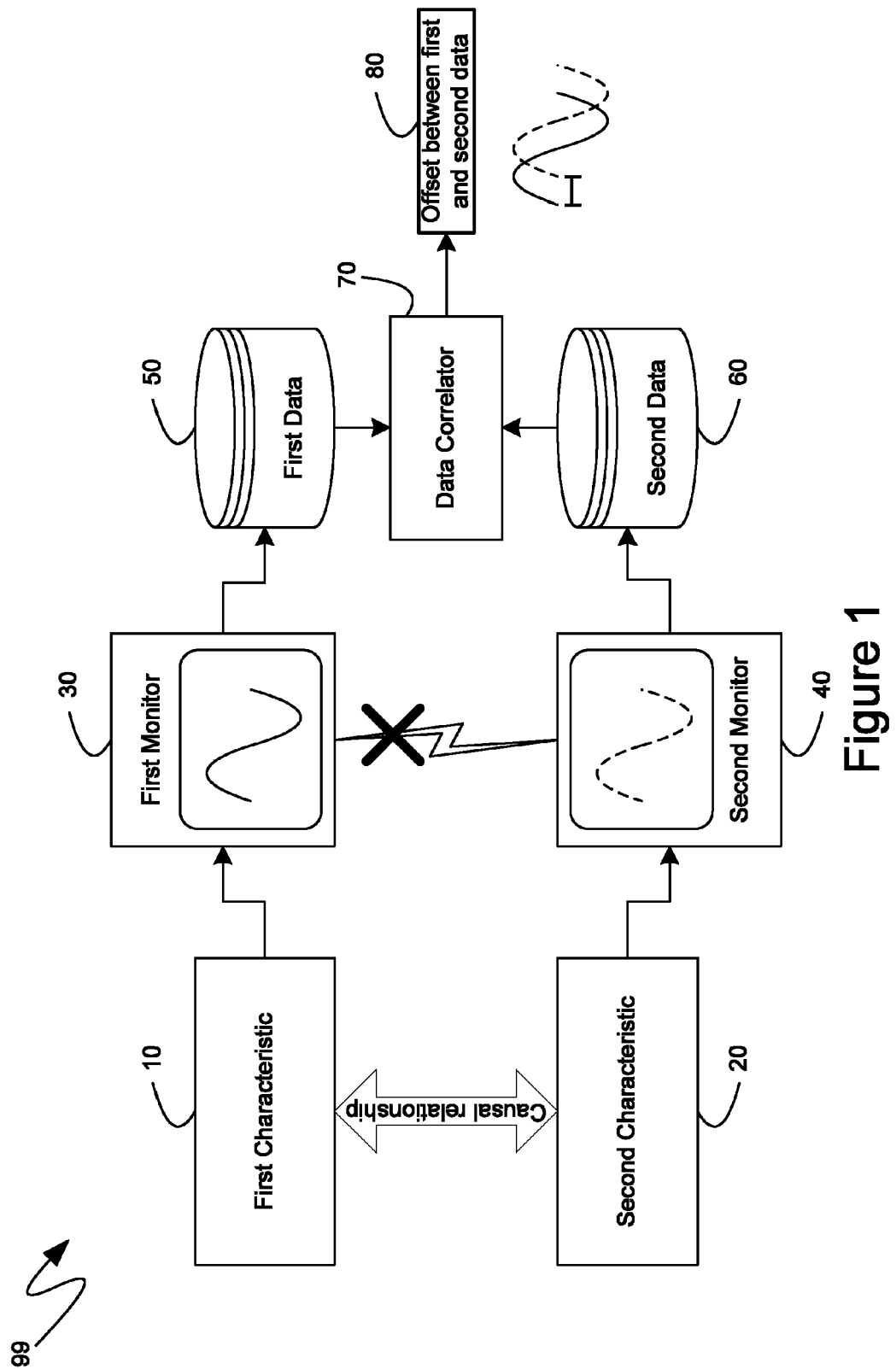
FIG. 1 is a block diagram of an exemplary system that provides context for the described functionality.

Turning to FIG. 1, an exemplary system 99 is illustrated comprising two measurable characteristics: a first characteristic 10 and a second characteristic 20, which are linked via a causal relationship. While the causal relationship illustrated in FIG. 1 may be bi-directional, a unidirectional causal relationship is equally applicable to the mechanisms described below. The exemplary system 99 further comprises a first monitor 30, that can obtain a first set of measurement data 50 by measuring the first characteristic 10 over a period of time, and a second monitor 40, that can obtain a second set of measurement data 60 by measuring the second characteristic 20 over a period of time. As further illustrated by FIG. 1, due to fundamental or practical limitations, the first monitor 30 and the second monitor 40 are not in communication with one another such that the collection of the first data 50 could be synchronized to the collection of the second data 60. Consequently, as will be recognized by those skilled in the art, while both the first data 50 and second data 60 comprise data entries for a range of time, the range of time of the first data 50 is independent of, and likely offset, from the range of time of the second data 60.

Consequently, as will be described in further detail below, a data correlator 70, which can be in the form of a computing device, such as that described below, can determine a correct offset 80 between the first data 50 and second data 60 such that the first and second data can be synchronized and useful information and analysis of the combined data can be performed.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
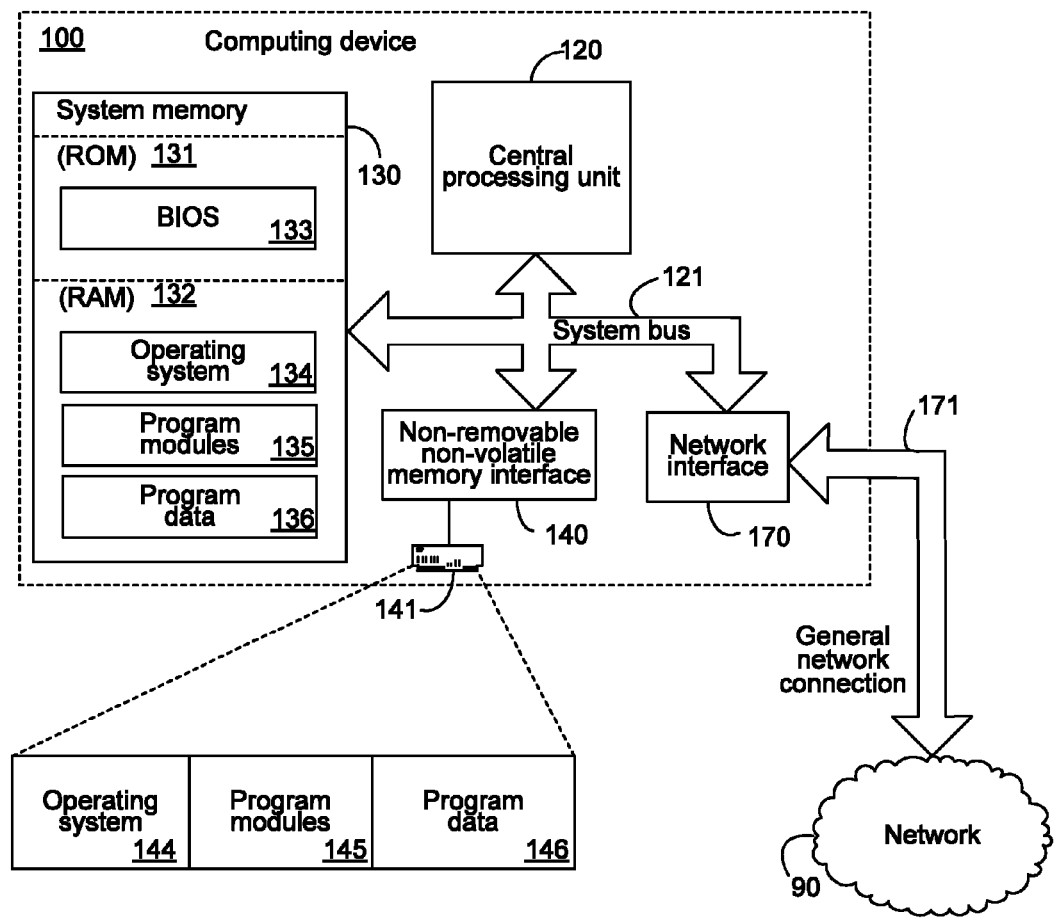
FIG. 2 is a block diagram of an exemplary computing device.

With reference to FIG. 2, an exemplary computing device 100 is illustrated, which can perform some or all of the actions attributed to the data correlator 70 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

To provide context for the causally related first characteristic 10 and second characteristic 20 of FIG. 1, the description below will proceed, in part, with reference to measurable characteristics of the computing device 100 of FIG. 2. In the particular example described in detail below, the first characteristic 10 can be the power consumption of the computing device 100, while the second characteristic 20 can be the CPU 120 utilization. As will be recognized by those skilled in the art, the CPU 120 can have a significant impact on the amount of power consumed by the computing device 100. Consequently, the power consumption of the computing device 100 can be causally related to the CPU 120 utilization. In particular, as the CPU 120 becomes more active, the measured power consumption is likely to increase, while, during idle states of the CPU, the measured power consumption is likely to decrease. Unlike the bi-directional causal relationship between the first characteristic 10 and the second characteristic 20 of FIG. 1, the causal relationship between power consumption and CPU utilization can be unidirectional, though such causality can be sufficient, as will be shown below.

As will be known by those skilled in the art, the power consumption of a device can be difficult to accurately measure from within the device itself. Thus, turning to FIG. 3, a system 200 is shown comprising, in part, the computing device 100 of FIG. 2, a power supply 230, a power monitor 240 and power data 250. While the power supply 230 is illustrated in FIG. 3 as being distinct from the computing device 100, in practice such a power supply can be co-located with the computing device, and its illustration as a separate component in FIG. 3 is only meant to show that the connection between the power supply and the computing device can be interrupted by a subsequently-attached power monitor 240.

Figure 3:
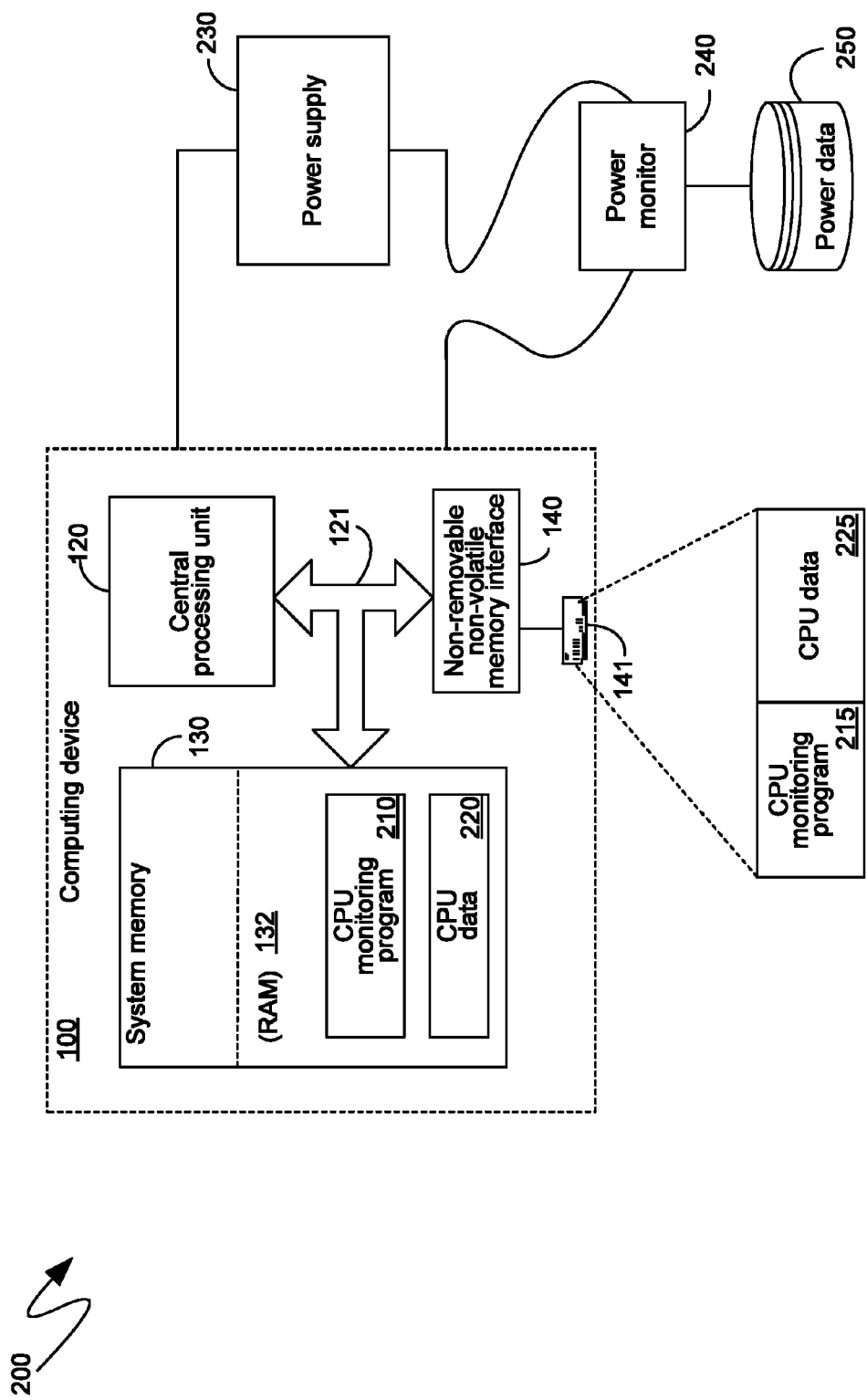
FIG. 3 is a block diagram of an exemplary system collecting two sets of measurement data.

In addition to the power monitor 240, the computing device 100 of FIG. 3 can comprise a CPU monitoring program 210 and CPU activity data 220 collected by the CPU monitoring program, both of which can be stored in the RAM 132. The CPU monitoring program 215 and the CPU activity data 225 can, likewise, be stored on a storage medium 141 from which they can be placed into RAM 132 for utilization. As in FIG. 2, the CPU monitoring programs 210 and 215 and the CPU activity data 220 and 225 are given different numbers to illustrate that, at a minimum, they are different copies.

Within the context of system 200, the CPU monitoring program 210 can collect data 220 regarding activity by the CPU 120 and the power monitor 240 can collect data 250 regarding the power consumption of the computing device 100. As indicated above, due to the causal connection between the activity of the CPU 120 and the measured power consumption, the power consumption data 250 is expected to be lower during periods of CPU inactivity, which can be indicated by the CPU data 220. Such causal information can be used to identify a correct offset between the CPU data 220 and the power consumption data 250.

Figure 4:
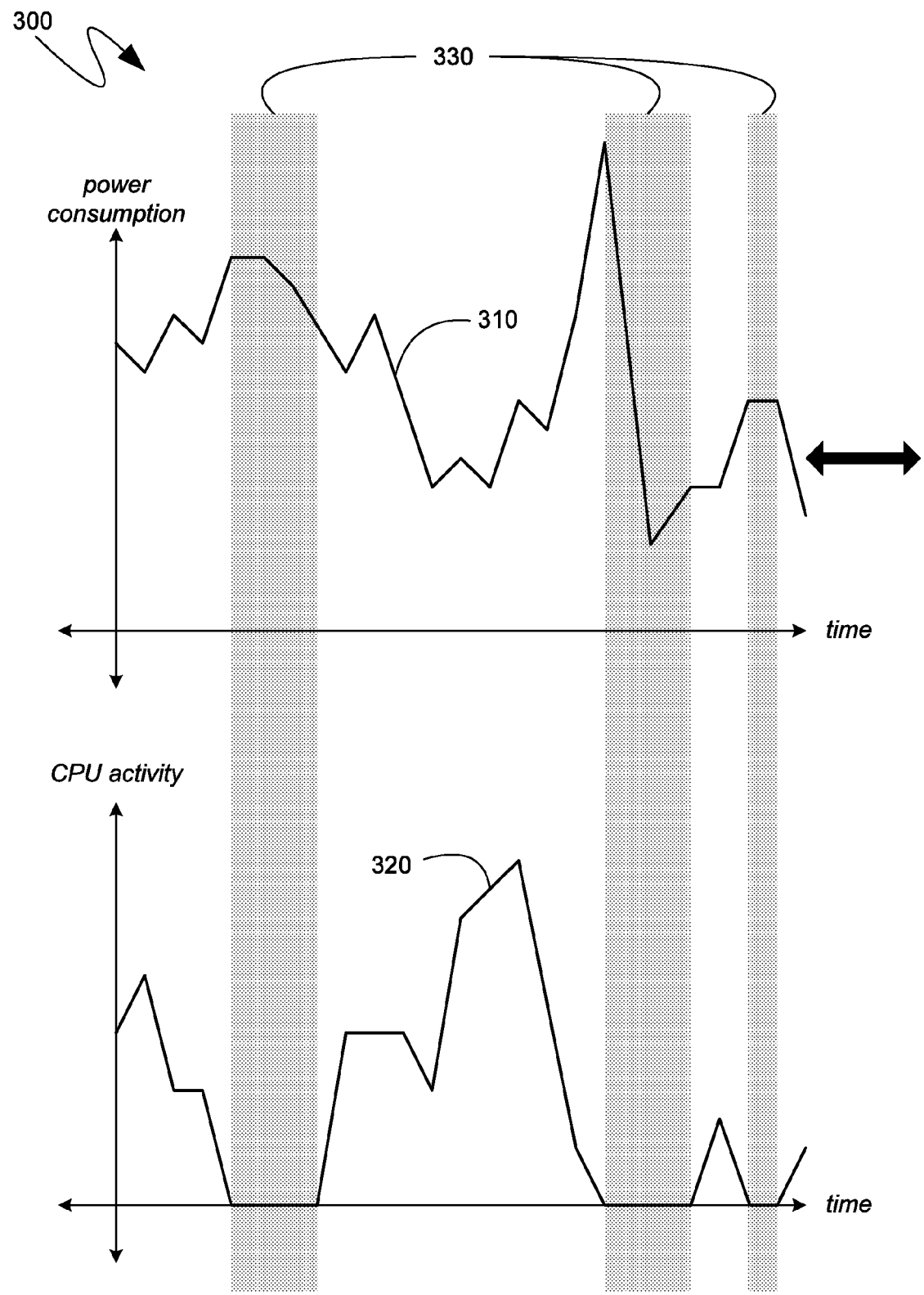
FIG. 4 is a graphical representation of two exemplary sets of measurement data and an exemplary aspect of determining a correct offset between them.

Turning to FIG. 4, graphical representation 300 illustrates the CPU data 220 and the power consumption data 250 as a function of the time when such measurements were obtained. In particular, the power consumption data 250 is graphically represented by the graph 310, while the CPU activity data 220 is graphically represented by the graph 320, both along magnitude and time axis. If the two sets of measurements were synchronized with respect to time, such that corresponding CPU activity measurements and power consumption measurements were associated with the same relative time, the times during which the CPU 120 was in an idle state, graphically illustrated by the shaded time segments 330, should correspond to the times during which the measured power consumption was lower since, based upon the previously described causal relationship between them, regardless of other power consuming activity in the system, when the CPU was in an idle state, the total power consumption of the system should, necessarily, be lower than when the CPU is not in an idle state.

Consequently, in one embodiment, a correct offset along the time dimension between the power consumption data 250 and the CPU activity data 220 can be determined by adjusting the time offset of the power consumption data 250 with respect to the CPU activity data 220 so as to find an offset with which low power consumption data coincides with the CPU in an idle state. Such offset adjustment can result in a visual "sliding" of the power consumption graph 310 with respect to the CPU activity graph 320, as indicated by the black arrows of FIG. 4. Thus, visually, the power consumption graph 310 can be slid along with respect to the CPU activity graph 320 to find a "best fit" of the low power consumption sections of the power consumption graph 310 within the shaded regions 330, which correspond to CPU idle states. To identify an offset at which such a correspondence between low power consumption and CPU idle is reached, a cumulative, aggregate power consumption within the shaded regions 330, corresponding to the times when the CPU 120 was idle, can be determined for each offset of the power consumption data 250 with respect to the CPU activity data 220. Thus, for each offset, a single value, representing the aggregate power consumed during times corresponding to CPU idle, can be determined. The resulting aggregate power consumption as a function of the offset can then be analyzed to identify a correct offset.

While the power consumed by the computing device 100 is affected by the utilization of the CPU 120, there can be other hardware and software elements of the computing device 100 that can likewise affect its power utilization. For example, a wireless network interface 170 can consume a significant amount of power, and the activation, or deactivation of such an interface can affect the power utilization of the computing device 100. Consequently, a proper offset between the power consumption data 250 and the CPU activity data 220 need not necessarily be identified by identifying an offset that yields the lowest aggregate power consumption within the shaded regions 330.

Instead, a proper offset between the power consumption data 250 and the CPU activity data 220 can be determined by identifying a local minimum of the aggregate power consumption within the shaded regions 330 as a function of the offset, where the aggregate power consumption values of surrounding offsets consistently increase away from the local minimum. Such a local minimum, with the corresponding consistent increase on either side, can indicate that the offset corresponding to the local minimum is the correct offset, since such data is consistent with the behavior expected of the aggregate power consumption values as the corresponding offset is varied within the proximity of the correct offset.

Figure 5:
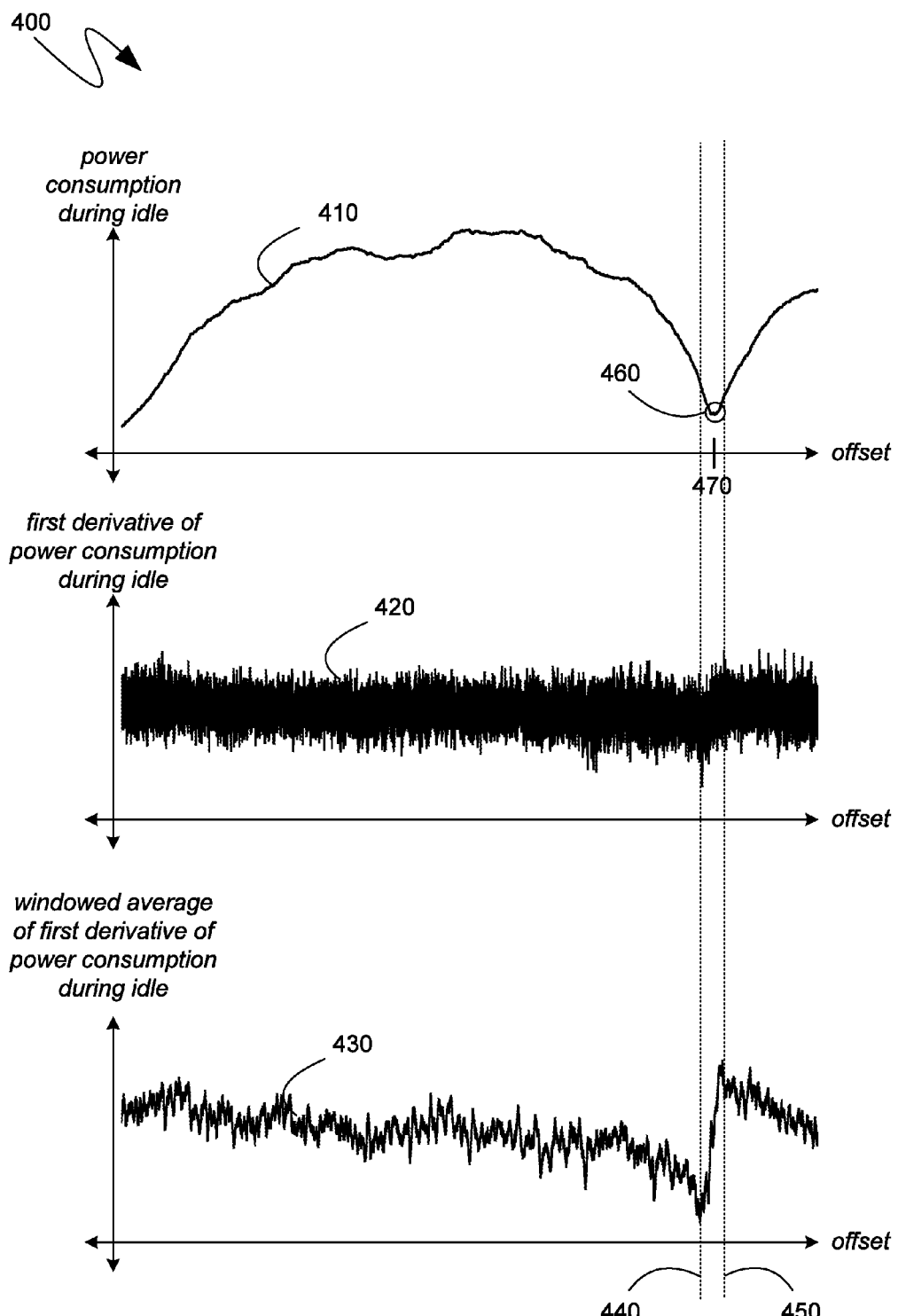
FIG. 5 is a graphical representation of derivations from sets of measurement data and a further exemplary aspect of determining a correct offset between the sets of measurement data.

Turning to FIG. 5, a graphical representation 400 illustrates various derivations, based on the power consumption data 250 and the CPU activity data 220, with respect to the offset between the power consumption data 250 and the CPU activity data 220. In particular, graph 410 of FIG. 5 illustrates the aggregate power consumed by the computing device 100 during times that the CPU 120 was idle, as the offset between the power consumption data 250 and the CPU activity data 220 is adjusted in the manner illustrated in FIG. 4 and described in detail above. As can be seen from the graph 410, a minimum 460 can identify a correct offset 470 that provides for the synchronization of the power consumption data 250 and the CPU activity data 220. While the correct offset 470 can be identified by an absolute minimum of the graph 410, it can also be identified by a local minimum, such as in the particular example illustrated in FIG. 5. As indicated previously, because other factors can influence power consumption, the correct offset 470 need not always correspond to an absolute minimum. Instead, as described above, the behavior of the graph 410 around point 460 can enable the identification of a correct offset 470. In particular, the consistent decrease of aggregate power consumption while the CPU was idle, represented by graph 410, as the offset approaches the correct offset 470, and subsequent increase of aggregate power consumption while the CPU was idle as the offset is increased beyond the correct offset 470 can aid in the identification of a local minimum 460 that can correspond to the correct offset 470.

While the point 460 can be easy to identify visually, in one embodiment, a more rigorous determination of the correct offset 470 can be based on a derivative of the values represented by graph 410, such as, for example, a first derivative. Graph 420 illustrates such a first derivative of the aggregate power consumption while the CPU was idle with respect to the offset between the power consumption data 250 and the CPU activity data 220. In many cases, however, such as the example illustrated in FIG. 5, the first derivative of graph 410 can be "noisy," such that distinctive features can be difficult to identify, both visually and mathematically.

Consequently, in a further embodiment, a windowed average of the first derivative can be used. As will be known by those skilled in the art, the windowed average value for any offset point can be the average of the values of the first derivative around that offset point. In one exemplary embodiment, a window of 100 points can be used, such that, for each offset point, the value of the windowed average of the first derivative corresponding to that offset point is the average of the 50 values of the first derivative for offsets less than that offset and the 50 values of the first derivative for offsets greater than that offset. Graph 430 of FIG. 5 provides a visual representation of the values of windowed averages of the first derivative that was graphically illustrated by graph 420.

Among the windowed average values, a minimum and maximum value within a predefined offset difference from one another can be identified. Such minimum and maximum values need not be absolute minima and maxima though, in the example illustrated by FIG. 5, they are. Rather the relevant minimum and maximum values are identified by their proximity to one another. The proximity of such local minimum and maximum values can represent the existence of significant variance in the rate of change of the aggregate power consumption during CPU idle that is illustrated in graph 410 since, as is known by those skilled in the art, the derivative, as illustrated by graph 420 and, consequently, the windowed average derivative, as illustrated by graph 430, quantify the rate of change in the values of graph 410.

In one embodiment, the offset values corresponding to such minimum and maximum values of the windowed average of the derivative of the aggregate power consumption during CPU idle can identify the range of offsets within which a minimum 460, corresponding to the correct offset 470, can be identified. Thus, the offset values identified by reference to the windowed average graph 430 can be used to define a range of offset values within the aggregate power consumption during CPU idle graph 410 as shown in FIG. 5, where the offset 440, corresponding to a minimum within graph 430, and the offset 450, corresponding to a maximum within graph 430, can define a range of offset values. Within the context of graph 410, representing the aggregate power consumption values during CPU idle, a local minimum 460 can be identified within the range of offsets defined by offsets 440 and 450. The local minimum 460 can correspond to the correct offset 470.

In an alternative embodiment, a phase shift can be taken into account and the correct offset 470 can be determined by reference to the windowed average graph 430. As will be known by those skilled in the art, the averaging operation described above can introduce a phase shift into the graph 430. However, in some cases, graph 430 may be easier to reference than graph 410, such as when the aggregated data for particular offsets is quite "noisy." In such a case, the phase shift associated with graph 430 can be calculated and taken into account, thereby enabling reference to graph 430 to identify the correct offset 470.

In a further alternative embodiment, the range defined by offsets 440 and 450 can be widened by a predefined amount to account for inaccuracies or other deviations. For example, the amount by which the range defined by offsets 440 and 450 can be widened can be a fixed amount, such as an additional 10 seconds in either direction. Alternatively, the amount by which the range defined by offsets 440 and 450 can be widened can be a variable amount that is dependent upon the averaging window.

Figure 6:
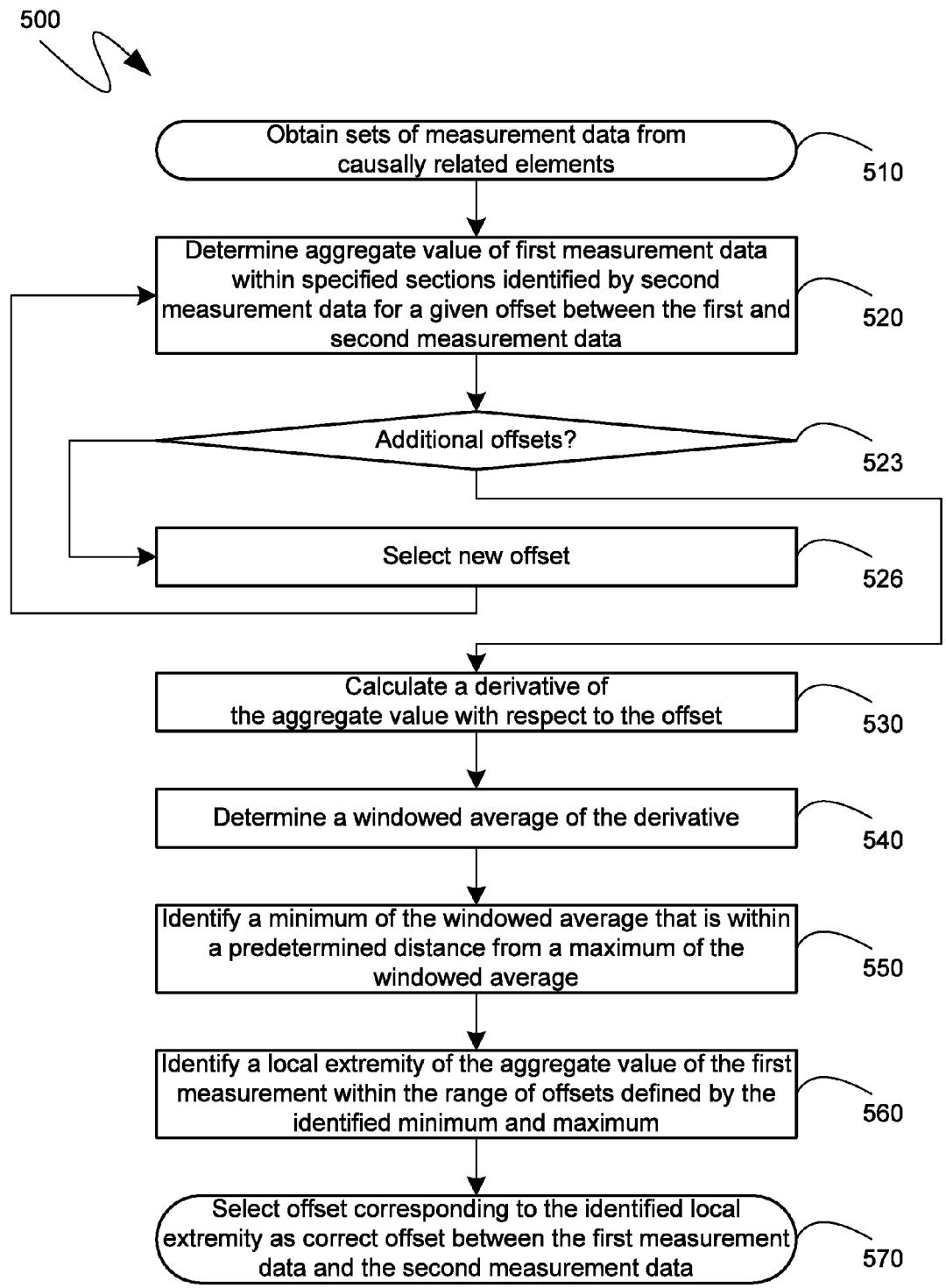
FIG. 6 is an exemplary flow diagram for determining a correct offset between two sets of measurement data.

While the descriptions above have focused on the identification of a correct offset between power consumption data 250 and the CPU activity data 220, they are equally applicable to the correlation between any two characteristics or elements that are causally related. FIG. 6 illustrates a flow diagram 500 providing an exemplary mechanism by which the above described steps can be applied to the measurement data from causally related characteristics or elements. Initially, at step 510, sets of measurement data can be obtained from the two or more causally related elements. Subsequently, at step 520, a total, or aggregate, value of one of the sets of measurement data within specified ranges can be determined for a given offset between the first and second measurement data.

The relevant ranges can be identified based on the causal relationship between the two or more characteristics or elements. In particular, if the causal relationship is such that one of the characteristics is influenced to be lower or higher when the other characteristic is in a particular state, or is exhibiting a particular behavior, then the relevant ranges can be identified based on the ranges of the measurement data of the second characteristic that indicate the second characteristic is in the particular state or exhibiting the particular behavior. Thus, in the above example, the relevant ranges were identified by reference to the CPU activity data 220 and corresponded to the entry of the CPU 120 into an idle state.

Once the relevant ranges are identified with reference to a second set of measurement data, the total, or aggregate, values of the first set of measurement data corresponding to the identified ranges can be determined for a given offset between the first and the second sets of measurement data. More specifically, the first set of measurement data can be established at a given offset from the second set of measurement data and the aggregate value of the first set of measurement data corresponding to the identified ranges of the second set of measurement data can be determined. Subsequently, at step 523 a determination can be made if the aggregate value obtained at step 520 should be likewise obtained for any other offsets between the first and second sets of measurement data. If it is determined, at step 523, that no additional offsets should be used, processing can proceed to the optional step 530, described below. However, if, at step 523, it is determined that another offset between the first and second sets of measurement data should be used, such another offset can be selected at step 526. In particular, at step 526, the first set of measurement data can be established at an incrementally different offset from the second set of measurement data and processing can then return to step 520, where the aggregate value of the first set of measurement data now corresponding to the identified ranges of the second set of measurement data can be determined. Each aggregate value of the first set of measurement data within the identified range can be associated with the corresponding offset between the first and second sets of measurement data used to compute the aggregate.

Subsequently, at optional step 530, a derivative of the above computed aggregate values with respect to the corresponding offset can be determined. In one embodiment, such a derivative, as determined at step 530, may be sufficient to perform the identification of a minimum and maximum of step 550. However, in an alternative embodiment, if the derivative calculated at step 530 is too variable, or "noisy," then, at optional step 540, a windowed average of such a derivative can be calculated. As indicated previously, a windowed average value for a given offset can be the average value of the set of derivative values corresponding to a predetermined number of offsets surrounding the given offset. Alternatively, at step 540, or 530, other functions may be applied, as necessary, to produce a detectable "signature" such as the local minimum within a predetermined range of a local maximum described above. Steps 520 through 540 could also be repeated multiple times, or collapsed into a transform matrix in a manner known to those skilled in the art.

At step 550, a minimum and maximum value can be determined based on the functions applied previously, such as the windowed average of step 540, or of the derivative values of step 530. In one embodiment, the minimum and maximum values can be determined based on the proximity of the minimum and maximum values to one another. As indicated previously, such minimum and maximum values within close proximity to one another can indicate reversals in the rate of change of the aggregate values of the first set of measurement data with respect to the offset between the first and second sets of measurement data. Each of the identified minimum and maximum values can correspond to an offset between the first and second sets of measurement data, and those two offsets can define a range of offsets.

Continuing to step 560, the range of offsets identified at step 550 can be used to define a region of offsets within which to identify a local maximum or minimum aggregate value as computed previously at step 520. The type of extreme value, whether a minimum or maximum, can be selected based on the causal relationship between the characteristics from which the measurement data was collected. Thus, for example, if the measured values of one of the characteristics is expected to decrease during specific states or behavior of a second characteristic, then the extreme value searched for in step 560 can be a local minimum. Conversely, if the measured values of one of the characteristics is expected to increase during specific states or behavior of the second characteristic, then the extreme value can be a local maximum.

Once, at step 560, a local extreme value is identified within the range specified by step 550, the processing can end at step 570 with an identification of a correct offset between the two or more sets of measurement data. Specifically, the correct offset can be identified as the offset corresponding to the local extreme value identified at step 570. In such a manner the offset between two or more sets of measurement data can be identified based, at least in part, on the nature of the causal relationship between the characteristics measured.

As can be seen from the above descriptions, mechanisms for rigorously determining a correct offset between two or more sets of causally related measurement data have been provided. In view of the many possible variations of the subject matter described herein, we claim as our invention all such embodiments as may come within the scope of the following claims and equivalents thereto.

We claim:

1. One or more computer-readable storage media comprising computer-executable instructions for determining a correct offset between a first and a second set of measurement data, the computer-executable instructions directed to steps comprising:

obtaining a first set of measurement data comprising measurements from a first element;

obtaining a second set of measurement data comprising measurements from a second element causally related to the first element;

identifying a range of measurements of the second measurement data corresponding to a state of the second element that is causally related to a measurable state of the first element;

calculating a first value based on measurements from the first measurement data that correspond to the identified range of measurements of the second measurement data, given a first offset between the first measurement data and the second measurement data;

repeating the calculating to calculate multiple values based on measurements from the first measurement data for multiple offsets incrementally different from the first offset;
identifying a local extreme value of the first value and the multiple values within an identified range of offsets; and
identifying, as the correct offset, a corresponding offset to the identified local extreme value.

2. The computer-readable storage media of claim 1 further comprising computer-executable instructions for: applying a function to the first value and multiple values with respect to the multiple offsets; and identifying the identified range of offsets by reference to a minimum of the applied function and a maximum of the applied function, the minimum and maximum being proximate to one another.

3. The computer-readable storage media of claim 2, wherein the applied function is a first derivative.

4. The computer-readable storage media of claim 3, wherein the identifying the identified range of offsets further comprises obtaining a windowed average of the first derivative and identifying the range of offsets by reference to a minimum of the windowed average of the first derivative and a maximum of the windowed average of the first derivative, the minimum and maximum being proximate to one another.

5. The computer-readable storage media of claim 1 comprising further computer-executable instructions for: identifying a second range of measurements of the first measurement data corresponding to a state of the first element that is causally related to a measurable state of the second element; calculating a second value based on measurements from the second measurement data that correspond to the identified second range of measurements of the first measurement data, given a second offset between the first measurement data and the second measurement data; and repeating the calculating to calculate additional multiple values based on measurements from the second measurement data for multiple offsets incrementally different from the second offset; wherein the identified local extreme value coincides with an identified second local extreme value of the second value and the additional multiple values within the identified range of offsets.

6. The computer-readable storage media of claim 1, wherein the first and second elements are elements of a computing device, and wherein the first measurement data is obtained from an external measurement mechanism external to the computing device and the second measurement data is obtained from an internal measurement mechanism internal to the computing device.

7. The computer-readable storage media of claim 6, wherein the first element is a power consumption of the computing device and the second element is a central processing unit activity of the computing device.

8. A system for determining a correct offset between a first and a second set of measurement data comprising:
a measurement device for measuring a first aspect of a computing device and generating therefore a first set of measurement data, the measurement device being external to the computing device;
a measurement process for measuring a second aspect of the computing device and generating therefore a second set of measurement data, the measurement process executing on the computing device; and
the computing device comprising at least one processing unit for performing steps comprising: identifying a range of measurements of the second measurement data corresponding to a state of the second aspect of the computing device that is causally related to a measurable state of the first aspect of the computing device; calculating a first value based on measurements from the first measurement data that correspond to the identified range of measurements of the second measurement data, given a first offset between the first measurement data and the second measurement data; repeating the calculating to calculate multiple values based on measurements from the first measurement data for multiple offsets incrementally different from the first offset; identifying a local extreme value of the first value and the multiple values within an identified range of offsets; and identifying, as the correct offset, a corresponding offset to the identified local extreme value.

9. The system of claim 8, wherein the at least one processing unit further performs steps comprising: applies a function to the first value and multiple values with respect to the multiple offsets; and identifies the identified range of offsets by reference to a minimum of the applied function and a maximum of the applied function, the minimum and maximum being proximate to one another.

10. The system of claim 9, wherein the applied function is a first derivative.

11. The system of claim 10, wherein the identifying the range of offsets further comprises obtaining a windowed average of the first derivative and identifying the range of offsets by reference to a minimum of the windowed average of the first derivative and a maximum of the windowed average of the first derivative, the minimum and maximum being proximate to one another.

12. The system of claim 8, wherein the at least one processing unit further performs steps comprising: identifying a second range of measurements of the first measurement data corresponding to a state of the first element that is causally related to a measurable state of the second element; calculating a second value based on measurements from the second measurement data that correspond to the identified second range of measurements of the first measurement data, given a second offset between the first measurement data and the second measurement data; and repeating the calculating to calculate additional multiple values based on measurements from the second measurement data for multiple offsets incrementally different from the second offset; wherein the identified local extreme value coincides with an identified second local extreme value of the second value and the additional multiple values within the identified range of offsets.

13. The system of claim 8, wherein the first aspect of the computing device is its power consumption and the second aspect of the computing device is an activity of the at least one processing unit.

14. A computer-implemented method for determining a correct offset between a first and a second set of measurement data comprising the steps of:
obtaining, on a data correlator computing device, a first set of measurement data comprising measurements from a first element;
obtaining, on the data correlator computing device, a second set of measurement data comprising measurements from a second element causally related to the first element;
identifying, at the data correlator computing device, a range of measurements of the second measurement data corresponding to a state of the second element that is causally related to a measurable state of the first element;
calculating, at the data correlator computing device, a first value based on measurements from the first measurement data that correspond to the identified range of measurements of the second measurement data, given a first offset between the first measurement data and the second measurement data;

repeating the calculating to calculate multiple values based on measurements from the first measurement data for multiple offsets incrementally different from the first offset;

identifying, at the data correlator computing device, a local extreme value of the first value and the multiple values within an identified range of offsets; and identifying, at the data correlator computing device, as the correct offset, a corresponding offset to the identified local extreme value.

15. The method of claim 14 further comprising the steps of: applying, at the data correlator computing device, a function to the first value and multiple values with respect to the multiple offsets; and identifying, at the data correlator computing device, the identified range of offsets by reference to a minimum of the applied function and a maximum of the applied function, the minimum and maximum being proximate to one another.

16. The method of claim 15, wherein the applied function is a first derivative.

17. The method of claim 16, wherein the identifying the identified range of offsets further comprises obtaining, at the data correlator computing device, a windowed average of the first derivative and identifying, at the data correlator computing device, the range of offsets by reference to a minimum of the windowed average of the first derivative and a maximum of the windowed average of the first derivative, the minimum and maximum being proximate to one another.

18. The method of claim 14 further comprising the steps of: identifying, at the data correlator computing device, a second range of measurements of the first measurement data corresponding to a state of the first element that is causally related to a measurable state of the second element; calculating, at the data correlator computing device, a second value based on measurements from the second measurement data that correspond to the identified second range of measurements of the first measurement data, given a second offset between the first measurement data and the second measurement data; and repeating the calculating to calculate additional multiple values based on measurements from the second measurement data for multiple offsets incrementally different from the second offset; wherein the identified local extreme value coincides with an identified second local extreme value of the second value and the additional multiple values within the identified range of offsets.

19. The method of claim 14, wherein the first and second elements are elements of a computing device, and wherein the first measurement data is obtained from an external measurement mechanism external to the computing device and the second measurement data is obtained from an internal measurement mechanism internal to the computing device.

20. The method of claim 19, wherein the first element is a power consumption of the computing device and the second element is a central processing unit activity of the computing device.

* * * * *